United States Patent [19]

Shirasaki

[11] Patent Number: 5,379,144

[45] Date of Patent: Jan. 3, 1995

[54] OPTICAL TRANSMITTER

[75] Inventor: Masataka Shirasaki, Kawasaki, Japan

[73] Assignee: Fujitsu Limited, Kawasaki, Japan

[21] Appl. No.: 153,494

[22] Filed: Nov. 17, 1993

Related U.S. Application Data

[63] Continuation of Ser. No. 805,711, Dec. 12, 1991, abandoned.

[30] Foreign Application Priority Data

Dec. 17, 1990 [JP] Japan ................... 2-411004

[51] Int. Cl.[6] .......................................... H04B 10/04
[52] U.S. Cl. ...................... 359/181; 359/180; 359/186; 372/26; 372/29; 372/38
[58] Field of Search ............... 359/180, 181, 182, 183, 359/184, 186; 372/26, 28, 29, 31, 38

[56] References Cited

U.S. PATENT DOCUMENTS

| | | | |
|---|---|---|---|
| 4,754,452 | 6/1988 | Henry | 359/125 |
| 5,025,487 | 6/1991 | Eichen | 359/181 |
| 5,073,331 | 12/1991 | Shirasaki | 372/29 |

FOREIGN PATENT DOCUMENTS

| | | | |
|---|---|---|---|
| 62-258528 | 5/1986 | Japan | 359/181 |
| 64-08356 | 9/1989 | Japan | H04B 9/00 |

OTHER PUBLICATIONS

Abstract of Patent No. EP 425079, Mackintosh et al., May 2, 1991.
Abstract of Patent No. GB 2,190,188, Giles et al., Nov. 11, 1987.
Abstract of Patent No. GB 2,119,083, Culshaw et al., Nov. 9, 1983.
Abstract of Patent No. GB 2,227,313, Kajioka, Dec. 27, 1988.
Abstract of Patent No. CH 671638, Dandliker, Sep. 15, 1989.
Abstract of Patent No. WO 8,602,721, Martin et al., May 9, 1986.
Abstract of Patent No. JP 60257313.
Abstract of Patent No. GB 2,089,976, Peterman et al., Jun. 30, 1982.
Abstract of Patent No. EP 50059, Papuchon et al., Apr. 21, 1982.
Abstract of Patent No. DE 3,035,153, Ulrich, Apr. 22, 1982.
Abstract of Patent No. DE 3,006,580, Peterman, Aug. 27, 1981.
Bergman, K., Haus H. A., *Squeezing in Fibres With Optical Pulses* Optic Letters, vol. No. 9, May 1, 1991.
Shirasaki, M., Haus, H. A., *Squeezing of Pulses in a Nonlinear Interferometer* Optical Society of America, vol. 7 No. 1, Jan. 1990.
*Scope With Short Coherence Length Source Injects Light Into Loop In Opposite Directions, Detects Interference of Beams After Several Revolutions And Has Reflector Or 2nd Loop.*

Primary Examiner—Richard E. Chilcot, Jr.
Assistant Examiner—Rafael Bacares
Attorney, Agent, or Firm—Staas & Halsey

[57] ABSTRACT

An optical transmitter is disclosed of the type having direct phase-shift and self-homodyne intensity modulation (DPSH-IM) applied to thereto. A periodic signal having the period corresponding to one time slot of a modulation current pulse for a laser diode is superimposed, together with the modulation current pulse, on a bias current to improve the transmission waveform.

5 Claims, 4 Drawing Sheets

FIG. 2A Frequency
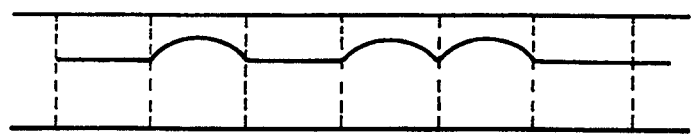
FIG. 2B Phase
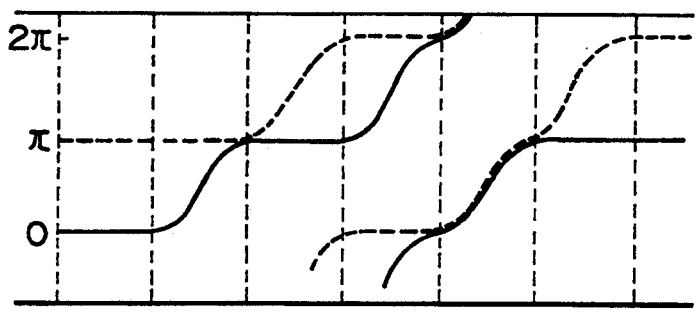
FIG. 2C Additional phase
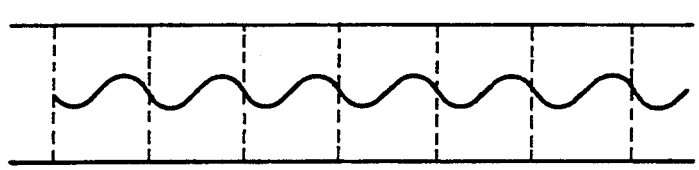
FIG. 2D Phase difference
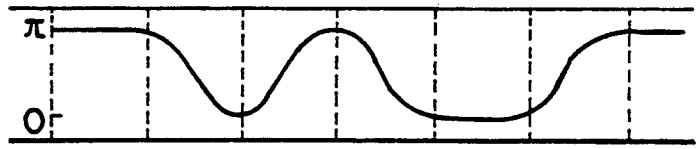
FIG. 2E Intensity
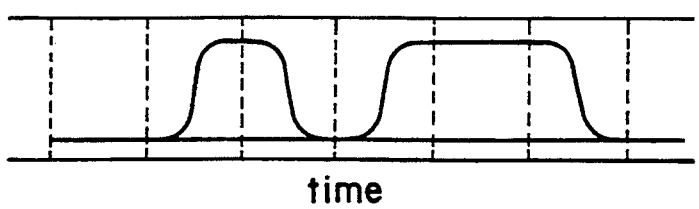
time Tr = 0.5
A = 0.3
B = 0.75
D = 1000

Tr = 0.5
A = 0
B = 0
D = 1000

OPTICAL TRANSMITTER

This application is a continuation of application No. 07/805,741, filed Dec. 12, 1991, now abandoned.

BACKGROUND OF THE INVENTION

1. Field of the Invention

The present invention relates to an optical transmitter for use in an optical fiber communication system and, more particularly, to an improvement in an optical transmitter to which DPSH-IM (Direct Phase-shift and Self-Homodyne Intensity Modulation) is applied.

In optical fiber communication systems, the modulation speed has been increased. Wavelength chirping is a problem in the direct intensity modulation of a laser diode. The chirping causes pulse distortions when a pulse passes through an optical fiber with wavelength dispersion. From the viewpoint of fiber losses, the most desirable wavelength is 1.55 μm. At this wavelength, a normal fiber has an approximate wavelength dispersion of 17 ps/km/nm. This limits the transmission distance. To avoid this problem, the use of an external modulator has been proposed. However, there is a problem with the external modulator at present that a high driving voltage is required for it.

To overcome the above described difficulties in high-speed modulation systems, i.e., problems of chirping and high driving voltage, and to achieve a narrowed light spectrum and a reduced driving voltage, we proposed DPSH-IM as a new intensity modulation system (PCT/JP89/00220 and IOOC '89, 20D4-5) and have proceeded with experimental and theoretical investigations of it.

2. Description of the Related Art

In the DPSH-IM system, modulation current pulses with a small amplitude are given to a laser diode being applied with a bias current higher than the threshold current to thereby obtain phase-modulated oscillating light. The phase-modulated light is passed through an optical interferometer to be converted into intensity-modulated light. Details of its operating principle is given in Shirasaki, M., Nishimoto, H., Okiyama, T., and Touge, T.: Fibre transmission properties of optical pulses produced through direct phase modulation of DFB laser diode, ELECTRONICS LETTERS 14th Apr. 1988 Vol. 24 No. 8 pp. 486–488.

According to the DPSH-IM, since small-amplitude modulation is possible with the use of a laser diode applied with a high bias current, it becomes possible to structure a system which is not easily affected by chirping and operates with a low driving voltage. However, in order to achieve still higher modulation speed and/or still longer transmission distance, it is required that the waveform deterioration due to wavelength dispersion is further reduced.

SUMMARY OF THE INVENTION

An object of the present invention is to provide an optical transmitter whereby a remarkable improvement of the transmission waveform is achieved.

According to the present invention, there is provided an optical transmitter comprising: a laser diode; a bias circuit for supplying the laser diode with a bias current for causing lasing in the laser diode; a modulation circuit for superposing a modulation current pulse corresponding to an input signal on the bias current so that the integrated value of the oscillation frequency of the laser diode varied by the modulation current pulse becomes a phase quantity of $\pi$ or $-\pi$; an optical interferometer for converting angle-modulated light from the laser diode to intensity-modulated light; and a periodic signal superposing circuit for superposing a periodic signal having the period corresponding to one time slot of the modulation current pulse on the bias current.

Preferably, the optical interferometer is a Mach-Zehnder optical interferometer having a difference in delay times of one time slot of the modulation current pulse.

Preferably, the periodic signal is a sine or cosine wave signal.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2A to FIG. 2E are waveform charts explanatory of the operating principles of the optical transmitter of FIG. 1;

DESCRIPTION OF THE PREFERRED EMBODIMENTS

An embodiment of the present invention will be described in detail below with reference to the accompanying drawings.

Figure 1:
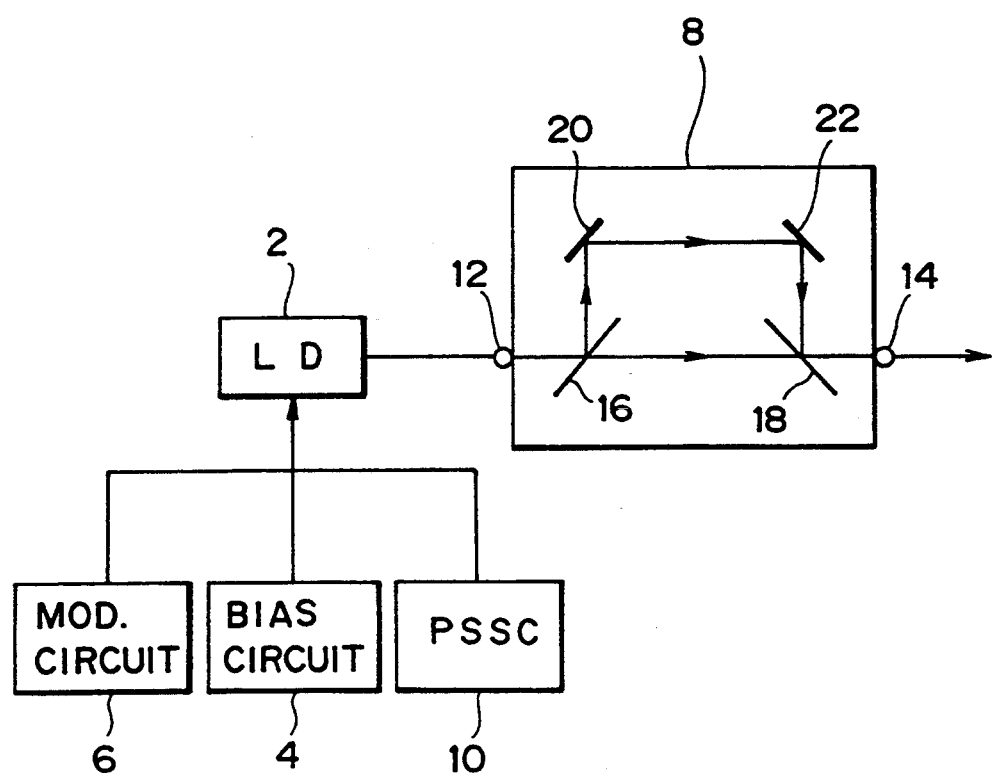
FIG. 1 is a block diagram of an optical transmitter illustrating an embodiment of the present invention.

FIG. 1 is a block diagram of an optical transmitter illustrating an embodiment of the present invention. Reference numeral 2 denotes a laser diode, 4 denotes a bias circuit for supplying a bias current to the laser diode 2, 6 denotes a modulation circuit for superposing modulation current pulses corresponding to an input signal on the bias current, 8 denotes a Mach-Zehnder optical interferometer (MZ optical interferometer) for converting phase-modulated light from the laser diode 2 into intensity-modulated light.

The bias current is set to a value higher than the threshold value for oscillation of the laser diode 2. The amplitude and pulse width of the modulation current pulses are set so that the integrated value of the oscillation frequency of the laser diode 2 varied by each one of the modulation current pulses becomes a phase amount $\pi$ or $-\pi$.

The MZ optical interferometer 8 splits entering light through an input port 12 into two component light waves to pass through a first and a second optical path. The component light waves passing through the first and second optical paths are then allowed to interfere with each other and output from an output port 14. The thus output intensity-modulated light is transmitted over an optical transmission line, not shown. The first optical path is that, through which the light input to the input port 12 is passed, transmitted by a half mirror 16 and a half mirror 18 in order of mention, to reach the output port 14. The second optical path is that through which the light input to the input port 12 is passed, reflected by the half mirror 16, a mirror 20, a mirror 22, and the half mirror 18 in order of mention, to reach the output port 14.

The time difference between the propagation delays in the first and second optical paths is set to the time period corresponding to one time slot of the modulation current pulses (or the input signal).

Reference numeral 10 denotes a periodic signal superposing circuit for superposing a periodic signal on the bias current. The period of the periodic signal corresponds to one time slot of the modulation current pulses (or the input signal). In the present embodiment, the periodic signal is a sine or cosine wave signal.

The operation of the optical transmitter will now be described with reference to FIG. 2A-FIG. 2E. First, the operating principle of the DPSH-IM when the periodic signal is not superposed will be described.

The output of the MZ optical interferometer 8 depends on the phase difference between the component light waves which pass through the first optical path and the second optical path and interfere with each other. If the phase difference is fixed at $\pi$ (or $(2n+1)\pi$, where n is an integer), then no power will be output. When the phase of the light wave input to the MZ optical interferometer 8 changes in one time slot, the output intensity will change.

Since the oscillation frequency of the laser diode varies with the injected current, the waveform of the modulation current pulses determines the frequency change of the light wave from the laser diode. FIG. 2A is a waveform chart showing the frequency shift, and an RZ type waveform is obtained there. By the RZ type, in this case, it is only meant that the signal level returns to zero every modulation time slot, and the duty ratio can be of any value. In an extreme case where the duty ratio is 1, the waveform will become a rectangular waveform of an NRZ type.

Since the phase of a light wave is expressed as the time integral of its frequency, the phase shift for a signal "1" during one time slot can be set to $\pi$ as shown in FIG. 2B by setting the amplitude of the modulation current pulses to a suitable value. This light wave is allowed to interfere with the light wave delayed by one time slot with equal amplitude in the MZ optical interferometer 8. The phase of the light wave delayed by one time slot is indicated by a broken line in FIG. 2B. The initial phase of the delayed light wave may be set at zero or E (the initial phase in FIG. 2B is set at $\pi$).

The output intensity of the MZ optical interferometer 8 is determined by the phase difference between the two interfering light waves. The phase difference is represented by the difference between the solid line and the broken line in FIG. 2B, which becomes as shown in FIG. 2D and varies between zero and $\pi$.

As a result of the interference, the light output reaches a maximum when the phase difference is zero and the light output becomes zero when the phase difference is $\pi$. Accordingly, the intensity waveform of the light output becomes as shown in FIG. 2E.

Although the output waveform is corresponding to the input signal, there is a delay in time corresponding to half of one time slot between the output signal and the input signal. Further, the output waveform is of an NRZ type regardless of the duty ratio of the RZ input signal. The duty ratio of the input signal determines the rise time and the fall time in the output waveform.

In the embodiment, a periodic signal, together with modulation current pulses, is superposed on the bias current. FIG. 2C shows the additional phase given by the periodic signal when the periodic signal is a sine wave. Since the period of the periodic signal is concurrent with the period of the modulation current pulses, the value of the additional phase is equal for each time slot. Further, the additional phase is given to both of the light waves propagating through the first and the second paths. Accordingly, even when the periodic signal is superposed on the bias current, the phase difference as shown in FIG. 2D, as in the case where the periodic signal was not superposed, is produced. As a result, intensity-modulated light corresponding to the input signal can be obtained.

When the periodic signal is superposed on the bias current, variation of the oscillation frequency of the laser diode 2 is increased. Therefore, it might be thought that an adverse effect of wavelength dispersion would be produced, but it is not the case. The effect of the wavelength dispersion is understood to cause a phenomenon of the pulse width of a light pulse, which is infinitely close to zero when the light pulse enters an optical fiber, becoming broadened when the light pulse is output from the emission end of the optical fiber. This phenomenon in general leads to an adverse effect but not always does so. When specific conditions are satisfied, the effect leads to an improvement in the transmission waveform. In the present embodiment, a sine or cosine wave signal is used so that the effect of the wavelength dispersion contributes to an improvement in the transmission waveform. The generation of the periodic signal is easy when a sine or cosine wave signal is used for the periodic signal.

When the periodic signal is a sine or cosine wave signal, the degree of improvement in the transmission waveform by the superposition of the periodic signal depends on its amplitude and phase. It is therefore desired that the amplitude and phase of the sine or cosine wave signal are set such that the improvement in the transmission waveform becomes most remarkable.

By performing a simulation using a large-sized computer, we found that the highest degree of improvement in the transmission waveform can be attained when $B \approx 0.75$ is satisfied in the expression of the additional phase $\phi$ by the sine or cosine wave signal $$\phi = A \cos(\omega t + 2\pi B),$$

where $\omega$ represents angular frequency and t represents time.

Figure 3:
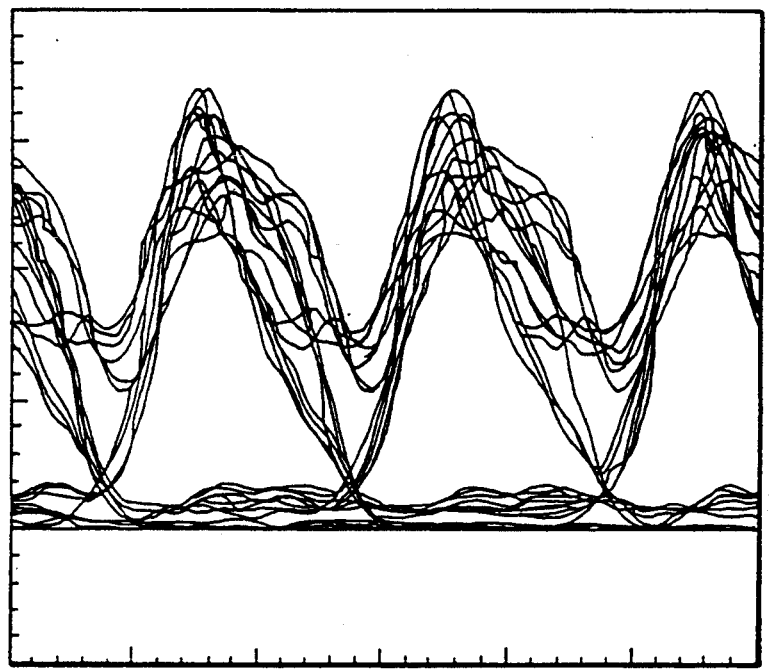
FIG. 3 is a diagram showing results of simulation of the eye pattern in the embodiment.

FIG. 3 is a diagram showing results of a simulation of the eye pattern. In this example, which was for obtaining intensity-modulated light of an NRZ code type by modulation current pulses of 10 Gbits/sec of an RZ code type, the duty ratio Tr of the modulation current pulses was 0.5, the constant A in the above expression was 0.3 (radian) and the constant B therein was 0.75, and the wavelength dispersion coefficient D of the optical transmission path was 1000 ps/nm. It is apparent from the diagram that the transmission waveform is improved.

Figure 4:
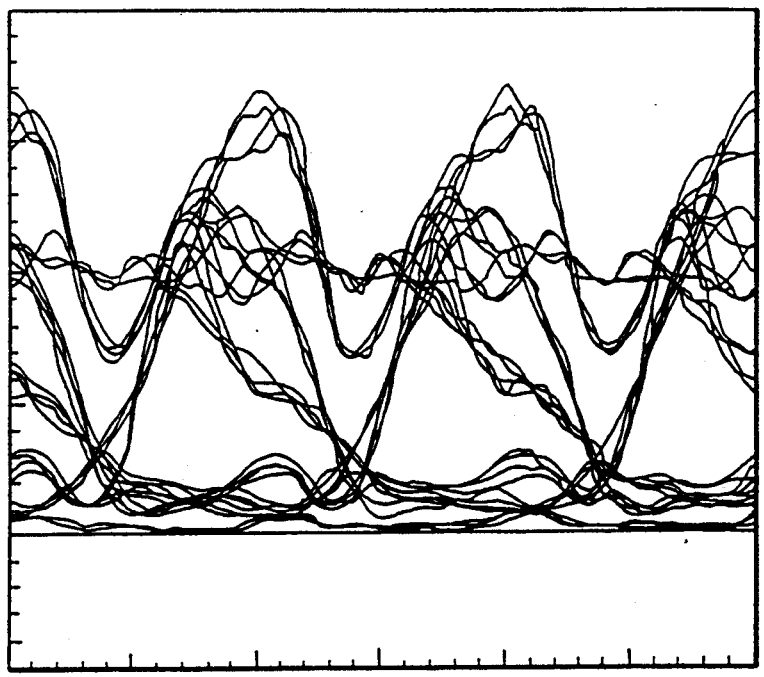
FIG. 4 is a diagram showing results of simulation of the eye pattern with a periodic signal not superposed.

FIG. 4 shows results of a simulation of the eye pattern when the periodic signal was not superposed. To make comparison with FIG. 3 easy, the simulation was performed with the duty ratio Tr and the wavelength diversion coefficient D set the same as those in the case of FIG. 3, and under the conditions of A=0 and B=0. It is apparent that the deterioration in the transmission waveform is remarkable as compared with that of the case where the periodic signal was superposed.

Thus, the transmission waveform is greatly improved by the present embodiment.

While the present invention has been described above as related to specific embodiments, the present invention is not limited to the details of such embodiments. For example, as the optical interferometer, other types of optical interferometers than the Mach-Zehnder type optical interferometer, such as Michelson type and Fabry-Perot type optical interferometer can be used. Further, as the periodic signal, other signals than sine or cosine wave signal, such as a triangular wave signal and a square wave signal can be used provided that they are capable of making the effect of the wavelength dispersion improve the transmission waveform.

Thus, preferred embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. An optical transmitter for transmitting an input signal, comprising:
   a laser diode;
   a bias circuit operatively connected to supply a bias current to cause lasing in said laser diode;
   a modulation circuit operatively connected to superpose on the bias current a modulation current pulse corresponding to the input signal so that an oscillation frequency of said laser diode varied by the modulation current pulse becomes a phase quantity of $\pi$ or $-\pi$;
   an optical interferometer optically disposed to receive angle-modulated light from said laser diode and convert the angle-modulated light to intensity-modulated light; and
   a periodic signal superposing circuit operatively connected to superpose on the bias current a periodic signal having a period corresponding to one time slot of the modulation current pulse.

2. An optical transmitter according to claim 1, wherein said optical interferometer comprises a Mach-Zehnder optical interferometer including an input port, a first optical path, a second optical path along which bifurcated light beams of light from said input port are transmitted, and an output port where the light beams from said first and second optical paths are combined to be output therefrom, and wherein a difference in transmission delay times in said first and second optical paths corresponds to one time slot of the modulation current pulse.

3. An optical transmitter according to claim 1, wherein said periodic signal superimposing circuit superposes the periodic signal as either a sine or cosine wave signal.

4. An optical transmitter according to claim 3,
   wherein said laser diode outputs a light signal with a transmission waveform, and
   wherein said periodic signal superposing circuit superposes the sine or cosine wave signal with a phase and amplitude selected to minimize deterioration of the transmission waveform of the light signal output by said laser diode.

5. An optical transmitter according to claim 3, wherein the sine or cosine wave signal has a phase $\phi$ expressed as $$\phi = \phi A \cos(\omega t + 2\pi B),$$

where $\omega$ represents angular frequency, t represents time and B is substantially equal to 0.75.

* * * * *

UNITED STATES PATENT AND TRADEMARK OFFICE
CERTIFICATE OF CORRECTION

PATENT NO. : 5,379,144
DATED : January 3, 1995
INVENTOR(S) : M. SHIRASAKI

It is certified that error appears in the above-indentified patent and that said Letters Patent is hereby corrected as shown below:

Column 1, line 8, delete "1."

Column 1, line 35, delete "2."

Column 3, line 47, after "or" delete "E" and insert --$\pi$--

Column 4, line 42, delete "B≈0.75" and insert --B$\doteq$0.75--

Signed and Sealed this

Fourth Day of April, 1995

Attest:

BRUCE LEHMAN

*Attesting Officer*   *Commissioner of Patents and Trademarks*